March 30, 1943. F. M. DALEY ET AL 2,315,366
CONVERTING BULK COMPOUND INTO VULCANIZED SPONGE RUBBER
Original Filed May 18, 1936    2 Sheets-Sheet 1
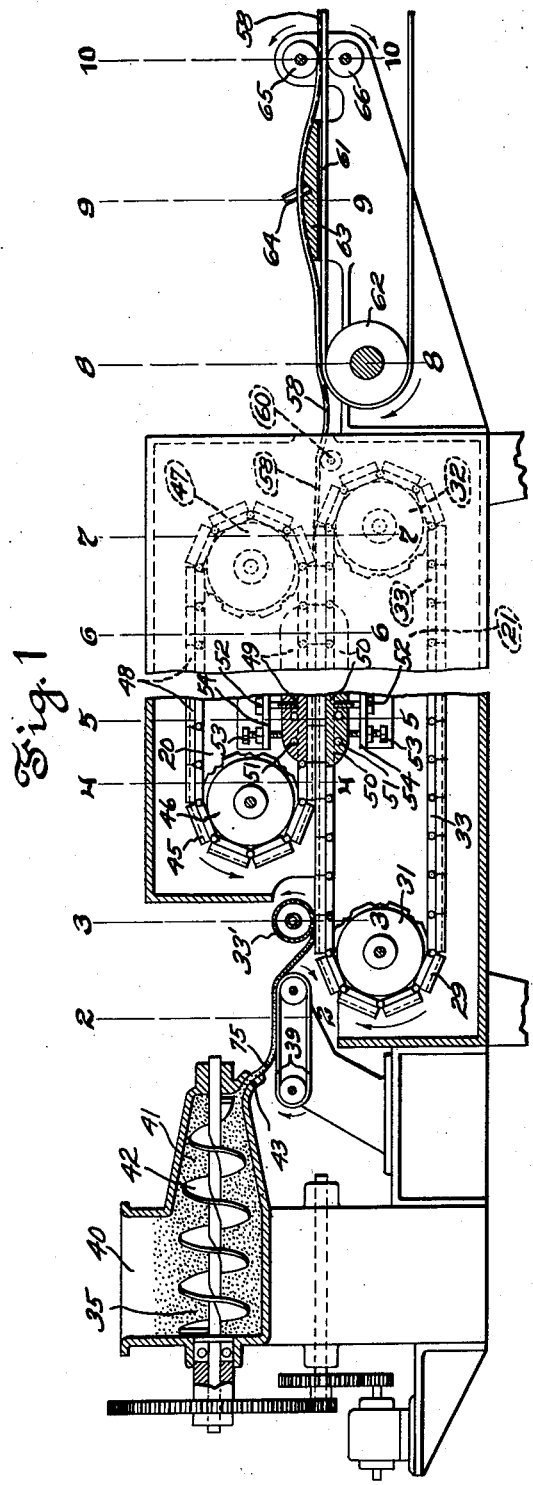
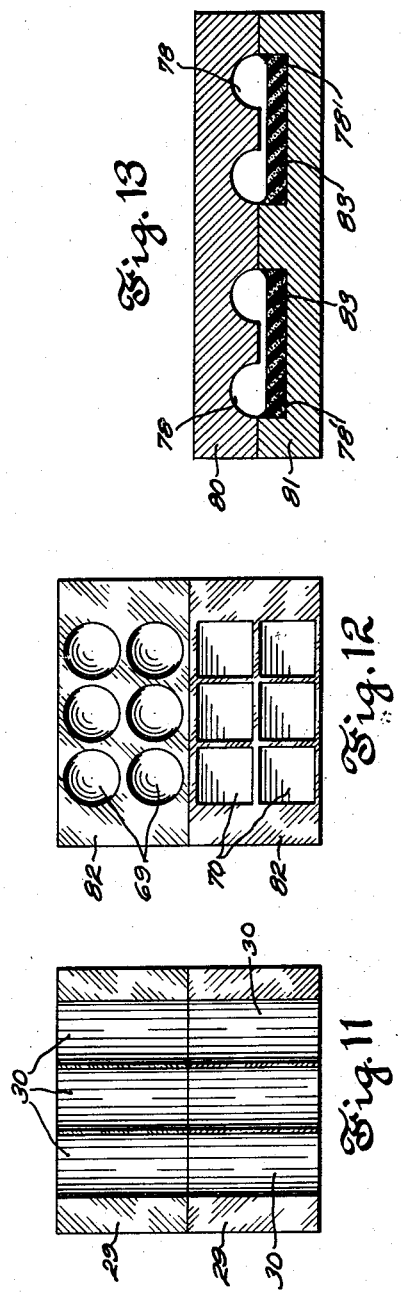
INVENTORS
Frederick M. Daley
Rudolf H. DeWyk
By
ATTORNEY

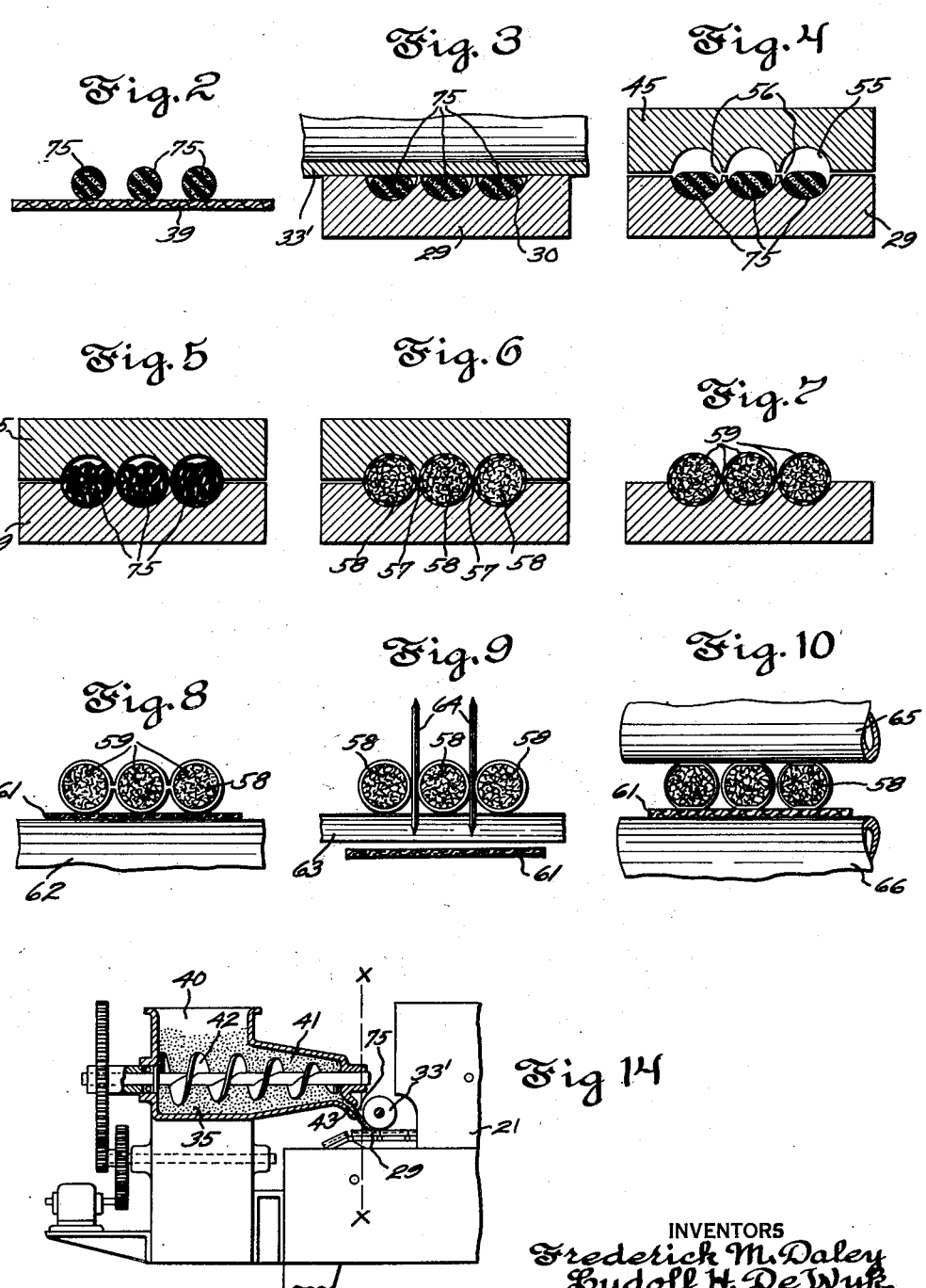

Patented Mar. 30, 1943

2,315,366

UNITED STATES PATENT OFFICE 2,315,366

CONVERTING BULK COMPOUND INTO VULCANIZED SPONGE RUBBER

Frederick M. Daley, Shelton, and Ludolf H. De Wyk, Ansonia, Conn., assignors to The Sponge Rubber Products Company, Shelton, Conn., a corporation of Connecticut Original application May 18, 1936, Serial No. 80,314. Divided and this application May 8, 1940, Serial No. 333,974

4 Claims. (Cl. 18—5.3)

This invention relates to methods, and to steps of continuous processes, for converting a bulk supply of vulcanizable composition containing rubber or synthetic rubber, as for instance sponge rubber compound, into continuous strips of vulcanized sponge rubber of unlimited length whether such strips are laterally separated or laterally united in their completed form. This application is a division of our copending application Serial No. 80,314, filed May 18, 1936, now Patent No. 2,200,262, granted May 14, 1940.

One object of the invention claimed herein is to convert unvulcanized materials such as that mentioned into either united or separated vulcanized sponge rubber strips by preparing and delivering separate charges of the unvulcanized material respectively to a plurality of side-by-side mold chambers which are constantly traveling and which serve to convey the charges continually toward and through a zone of vulcanizing heat.

A further object is to prepare and deliver simultaneously and respectively to such mold chambers, and as a continuous process, a plurality of side-by-side traveling strip-like charges of sponge rubber compound of continuous unlimited length.

A further object is simultaneously to prepare multiple traveling strips of sponge rubber compound by continually and simultaneously generating them side-by-side in a manner to predetermine the cross sectional shape of each thereof, as well as to predetermine the positional relationship which such shapes will assume and maintain as the extruded strips advance toward and into the traveling mold chambers.

A further object is to avoid the necessity for calendering a shapeless supply of sponge rubber compound into a sheet as a process preliminary to feeding the compound to a vulcanizing machine which at the same time avoids the necessity for dividing or severing such sheet into separate strips of the compound before it reaches or enters the traveling mold chambers of a vulcanizing machine.

A still further object is to make intermittent the delivery of short lengths of sponge rubber compound from the nozzle orifices of the extruding machine so that pellets or short pieces, instead of continuous strips of the extruded sponge rubber compound, may be supplied to cavities in traveling lower mold sections that combine with upper traveling mold sections to form closed mold chambers as the compound passes along into the zone of vulcanizing heat.

These and other objects will be more clearly understood from the following description in connection with which there is illustrated in the accompanying drawings examples of ways and means which may be employed in carrying out the improved processes. In the drawings:

Fig. 1 shows in operative combination the apparatus of Figs. 1 and 3 of our aforesaid copending application and constitutes a side view of a combined extruding machine, conveying and feeding apparatus, and continuous process vulcanizing machine.

Fig. 2 shows on a larger scale, a cross-sectional view of three of the many possible side-by-side traveling strips of extruded unvulcanized sponge rubber compound at the stage of processing indicated by vertical line 2—2 in Fig. 1.

Fig. 3 shows a succeeding condition of the material at the stage of process indicated by vertical line 3—3 in Fig. 1.

Fig. 4 shows the imprisoned condition of the material at the further stage in the process indicated by vertical line 4—4 in Fig. 1.

Fig. 5 shows the expanding condition of the material at the further stage in the process indicated by vertical line 5—5 in Fig. 1.

Fig. 6 represents the fully vulcanized condition of the material at the stage in the process indicated by vertical line 6—6 in Fig. 1.

Fig. 7 shows the vulcanized product of Fig. 6 released by the departure of the upper mold section from the lower mold section as is the condition at the stage in the process indicated by the vertical line 7—7 in Fig. 1.

Fig. 8 shows the vulcanized strip of Fig. 7 delivered from the cavities in the lower mold sections to conveyance by an endless belt at the stage in the process indicated by the vertical line 8—8 in Fig. 1.

Fig. 9 shows the material at its point of longitudinal severance indicated by the vertical line 9—9 in Fig. 1.

Fig. 10 represents the severed lengths of vulcanized material at the point where they are drawn forwardly by feed rollers to be delivered from the process, this action occurring at the stage indicated by the vertical line 10—10 in Fig. 1.

Fig. 11 is a plan view of two adjoining mold blocks like that shown in cross section in Figs. 3 and 7 and having aligned and communicating cavities in their upper faces.

Fig. 12 shows still different arrangements of mold cavities in adjoining blocks otherwise like those of Fig. 11.

Fig. 13 is a cross sectional view through material confining upper and lower mold sections at a stage in the process similar to that represented by Fig. 4 showing a modified cross sectional shape of mold cavities.

Fig. 14 shows the extruder dropping its extruded unvulcanized strips of compound directly into the traveling mold cavities.

While our improved process in some of its aspects lends itself not only to the molding and vulcanizing of sponge rubber compound, but with equal advantages to the molding and vulcanizing of ordinary rubber, synthetic rubbers and analogous plastic materials, it will for simplicity be described with reference to the accompanying drawings as employing sponge rubber compound as the material to be processed.

A well known characteristic of such compound is its soft and doughy consistency before vulcanization. Its first reaction to the application of heat is to become materially softer than at normal temperature so that it may even flow or spread when unconfined. Following this first reaction to heat, the compound will be caused to liberate gasses within itself which causes its substance to swell, all of which effects are encountered before permanent vulcanization into a porous resilient structure takes place.

In the aforesaid copending application the importance of vulcanizing sponge rubber compound during its continuous travel through a zone of heat in preference to vulcanizing successive portions of the length of the strips while they dwell in fixed relationship to a source of vulcanizing heat is fully explained. This of course calls for the continual feeding of the vulcanized strips to the source of heat. The cross sectional shapes possible to continually fed strips which are generated by severing them from a wide thin traveling sheet of the material are obviously limited. However, this is not the case with strips which are simultaneously generated by extruding sponge rubber compound through a series of nozzle orifices which may be made of any desired shape and which will accurately impart their shape to the material extruded through them.

The improvements avail of this means for unrestricted predetermination of the cross sectional shape of the sponge rubber compound strips before they reach the traveling mold section. Particular problems to be solved concern the successful maintenance of a predetermined shape after it is thus generated as well as the attainment and maintenance of a definite positional relationship of the cross sectional shapes of adjacent strips as they are conveyed onward side-by-side from their generating orifices in the extruding head toward their respective traveling mold sections into whose cavities they are progressively to be delivered.

Fig. 1 represents in side elevation an apparatus the rotating parts of which may be journaled in spaced upright walls 20 and 21 and are substantially incased except for relatively small inlet and outlet passages for admitting and delivering the continuous length of material or compound to be processed.

Within these upright walls, a train of rigid bottom sections or walls 29 of an articulated traveling mold receives the traveling compound which is to be processed in traveling, mold-formed, vulcanizing chambers at some point ahead of the point in its travel indicated by vertical line 3 in Fig. 1. Fig. 3 is drawn on a scale enlarged to suitable actual size and is a cross sectional view taken at this point indicating a suitable shape and arrangement of molding cavities 30 which in end to end relation as shown in Fig. 13 may form continuous laterally adjacent grooves in the top surface of all mold sections 29 which are horizontally aligned in Fig. 1 between the tops of the left sprocket wheel 31 and the right sprocket wheel 32. These wheels are rotatably supported between the frame walls 20 and 21 and may be continually rotated in unison by any suitable means at such speed as will impel an endless linked belt or chain 33 with a speed of linear travel which accords with the linear travel of the extruded strips of compound 44 as they issue simultaneously and respectively from adjacent orifices 43 in the extruding head. Each link of belt or chain 33 may carry a different one of the lower mold sections 29 which enables these sections to travel continually in an endless procession and to be held in abutting contact as they progress from left to right in Fig. 1.

With further reference to the extruding apparatus, shapeless compound in the hopper 40 descends to the level of the extrusion chamber 41 in which helically finned extrusion screw 42 rotates and constantly forces the compound toward the right. There are other well known forms of plastic extruding apparatus which will serve the purpose. There is a series of the extrusion orifices 43 each of which may be given such shape as will cause the compound 35 to be extruded therethrough in any desired form of cross section, as for instance the round form illustrated in Fig. 2. This method of simultaneously delivering continually fed separately restricted masses of the compound lends itself to dispensing with the step of severing a traveling sheet of compound into strips or storing it as a supply of separate strips. The separate orifices 43 may be spaced and arranged in any commonly practiced relation and be of proper size to deliver respectively to each of the mold cavities 30 a strip of the compound properly proportioned thereto like the separated strips 75 shown in cross section in Fig. 2.

Figs. 1 and 2 show the traveling strips of compound 75 to be delivered from the extruding head to the support of an endless carrier belt 39 which is constantly traveling in the direction of the arrows about suitably rotated supporting pulleys at a linear speed preferably equal to the speed of emergence of the strips from the extruding head. This conveyor belt is long enough to afford opportunity for arranging the traveling strips side by side in any desired positional relationship while they lie on the belt and the strips will maintain such relationship up to the point where they are played off from conveyor 39 into the cavities 30 of the traveling mold sections 29.

The above described method of preparing and feeding strips of sponge rubber compound respectively delivered to mold cavities 30 will be recognized to constitute steps for continually controlling and restricting the volumetric size of each separate strip of the compound to a mass smaller than the size of the chamber in which it is to be molded and vulcanized and the next step in the process consists in completing the enclosure of the delivered compound to confine it within its molding chamber.

This takes place at the point in the travel of the unvulcanized compound indicated by the vertical line 4 in Fig. 1. A corresponding endless train of rigid upper block sections 45 forming an articulated closure for roofing over the mold sections 29 is supported by the sprocket wheel 46 and sprocket wheel 47 which serves to impel the link belt or chain 48 and the upper mold blocks 45 respectively carried by the links thereof with a linear speed equal to that of the travel of the lower mold blocks 29. As the upper and lower mold blocks come into contact they form an enclosing chamber for conveying and vulcanizing the traveling compound as shown in Fig. 4 and their cavity containing surfaces register and align the cavities and thus ride in contact or slightly apart as adjustably determined by the vertical spacing of an upper heater plate 49 and a lower heater plate 50, both of which plates may contain passages or conduits furnished with steam as the source of heat or be equipped with or associated with gas burners, electric heating units, or any equivalent thereof, for providing a zone of heat sufficient to vulcanize the mold contained compound.

The steam passages illustrated are indicated at 51 in Fig. 1 and the spacing of the heater plates may be determined by suitable adjustment of pull screws 52 having threaded engagement with the heater plates and push screws 53 having threaded engagement with the flange 54 of a frame carried bracket. The traveling mold blocks 29 and 45 are thus heated by the adjustable heater plates 49 and 50.

It is not necessary that the traveling upper and lower mold block sections be given actual sliding contact with the surfaces of their heater plates since adjustably spaceable track rollers may be introduced and carried by the frame, against which rollers the mold sections, or the link belts or chains which carry them, may ride in well known manner. The upper and lower mold sections may thus be constrained by said rollers to travel in controlled proximity or in actual contact with one another while sufficiently near the heater to be heated to a vulcanizing temperature.

As the chamber closeting mold sections 29 and 45 continue their travel from left to right in Fig. 1 in proximity to the heater plates, the confined rubber compound becomes heated and begins to liberate gasses within and from itself which causes its substance to swell or expand from its condition represented in Fig. 4 to a condition roughly represented in Fig. 5 and this action continues until the compound has completely filled its chamber in the mold if a properly sized mass of the proper composition has initially been delivered to the mold cavities while excess gasses find vent outward from each mold section past and between the adjoining ends of the mold sections in each articulated train. The compound expands from its stage in Fig. 4 to its stage as in Fig. 5 in the presence of sufficient empty space to allow some of the gasses to travel oppositely to the direction of travel of the mold sections and thereby issue from the mold chamber where the mold sections first come together at about the point indicated by the vertical line 4—4 in Fig. 1.

As the expansion of the compound continues it is ultimately limited by the size of the mold chamber and if the upper and lower mold sections fail to abut against each other or to maintain absolute contact in their contiguous portions separating the cavities 30 in section 29 and separating the cavities 55 in section 45, the expanding compound in the separate cavities will force its way through the cracks 56 thereby provided and become reunited or interconnected by a thin web 57 of the rubber compound before it attains a fully vulcanized condition. Fig. 6 shows this to have happened at some stage in the process between the points in the travel of the material arbitrarily indicated by the vertical lines 5—5 and 6—6 in Fig. 1 and further represents the sponge rubber bodies 58 fully vulcanized in accurate conformity with their respective chambers and connected by the thin webs 57 of the vulcanized rubber.

Vulcanization now being completed, the resulting single piece strip represented by 59 in Fig. 7 is released from confinement by the upper mold sections 29 progressively and gradually as the latter begin their upward travel about the periphery of wheel 47 at the stage in the process represented by the vertical line 7—7 in Fig. 1.

A suitable roller 33' may be rotated continually by means not shown so as to have a linear surface speed equal to that of the travel of mold sections 29 and to be in contact with the top surfaces thereof whereby in passing under this roller as carried by the mold sections 29, the strips of compound 75 are urged downward toward the bottom of the mold cavities 30 as indicated in Fig. 3. Where the strips are of such cross sectional shape in relation to the shape of the mold cavity 30 that they fall thereinto freely by gravity (without urging by extraneous forces) as in the present case, roller 33' may be omitted. When used, the roller 33' or its equivalent may be water cooled or not depending on the tendency of the strip of compound to stick to the surface of the roller.

In the processing steps which have been described, it will be clear that no portion of the length of the continuous traveling material is subjected to any different application of heat either in terms of the intensity of heat or duration of time than is any other portion of the material, whereby uniform vulcanization of unlimited length of a rubber product is truly accomplished while an expanding compound is confined within oversize chambers whose walls are rigid and preferably of metal so that there is imparted to the vulcanized product a definite body shape and a contour and marking of all its surfaces, conforming finally to the surfaces of the mold with which it travels in contact while being vulcanized.

The continuous length of vulcanized strip-like sponge rubber may then be transported over one or more rotatable support rollers 60 to assist in its departure from the mold sections and onto an endless traveling belt 61 only one of whose supporting pulleys is shown at 62. Just above the surface of the belt the sides of the machine frame may be bridged by a stationary platform 63 on which may be mounted a crosswise extending row of suitable knives or cutters of any appropriate form one of which is indicated at 64 in Fig. 1 as an ordinary double edged blade of a safety razor preferably inclined at its top toward the approaching vulcanized strip. These cutters may be spaced to register with the connecting webs 57 of the sponge rubber strip 59 so that as the strip is continually pulled toward the right by cooperative rotation of the upper feed roller 65 and lower feed roller 66, the webs 57 will progressively be severed, thus as a continuous process dividing the single piece strip 59 into separate narrower strips as indicated in Figs. 11 and 12 all of which may be somewhat squeezed between the upper feed roller 65 and the conveyor belt 61 at the point where the lower feed roller 66 rotatively supports belt 61 as it travels.

Fig. 12 shows differing shapes of cavities which may have the same respective size and shape both in the upper surface of the lower mold sections 82 and in the lower surface of the upper mold sections (not shown) and be positioned to register, thereby to form closed chambers, after there has been delivered to the lower cavities suitable masses of sponge rubber compound substantially smaller than the size of the chamber, for vulcanizing such masses into molded separate articles such as balls or blocks of sponge rubber. If any or all of the spherical cavities 69 and the cubical cavities 70 are given communication by space between the mold surfaces when the latter are brought together to form a confining chamber, the resulting vulcanized rubber bodies will be produced in web connected form, whereas if the planar mold surfaces abut closely together, the resulting product will be separate articles. Suitably restricted masses of sponge rubber compound may be delivered to cavities 69 and 70 by the feeding of continuous strips as in Figs. 1 and 2, or separate pellets of compound of undersized mass may individually be dropped into each of the cavities of Figs. 11 and 12 as they move successively past the points represented by vertical lines x—x in Fig. 14. Such pellets may be delivered by hand or may be punched out of sheet compound into the cavities as each cavity arrives at and passes the punching station, or they may intermittently be extruded through any or all of orifices 43 in Fig. 14. Here the conveyor belt 39 is omitted and the extruding machine drops its extruded material directly into the cavities of the traveling mold sections 29.

For large volume production at low unit cost, as many of the strips 75 as is desired may simultaneously be generated as separate strips or in side-by-side web connected relationship. Thus a vulcanized sponge rubber product consisting of forty or more web-connected parallel and longitudinal bodies may be generated continually by our improved process.

The steps which comprise our improved process involve principles of treatment which are not dependent upon the particular type of apparatus herein illustrated to exemplify the process. For instance when the severing roller 33' is omitted, the mere closing of the mold sections may be relied upon to grip and advance the strips 75 to within their respective vulcanizing chambers. This is true of all of the forms of cavities illustrated in Figs. 11, 12 and 13, inclusive.

The shapes of the mold cavities and of the chambers which they combine to form, may vary to suit the purposes of the product, and the invention will be understood to reside in our process which has been described without limitation to any of the particular materials or apparatus which have been referred to in the disclosure hereof. The upper and lower mold sections 80 and 81, in Fig. 13 for example, are shown to possess top and bottom mold cavities 78 and 78' of respectively differing shapes. Undersized extruded strips 83 of compound having a suitable cross sectional shape to enter and occupy the lower of these cavities may be deposited therein by any of the methods and means herein proposed.

We claim:

1. In a process for converting side-by-side simultaneously extruded separate charges of sponge rubber compound into articles of vulcanized sponge rubber involving the reception of said charges into traveling vulcanizing chambers larger than said charges and formed in part by the bottom traveling wall of a traveling mold, the steps which include, progressively and simultaneously extruding from a bulk supply of sponge rubber compound continuous unbroken lengths of separate charges of said compound, progressively playing out said continuous extruded lengths of said charges simultaneously side-by-side through space onto a traveling conveyor surface, supporting said charges in exposed and accessible manner on said surface throughout a time consuming extent of travel thereof in a sufficiently level path to enable said charges to retain their random self assumed positions on said traveling surface, then selectively rearranging such of said charges on said traveling surface as may be necessary to bring them into corrected positions and relationship, and then progressively playing off said rearranged charges from said traveling surface onto said traveling bottom mold wall in corrected positions and proper alignment to register with and be imprisoned respectively in said traveling vulcanizing chambers.

2. In a process for converting side-by-side simultaneously extruded separate charges of sponge rubber compound into articles of vulcanized sponge rubber involving the reception of said charges into traveling vulcanizing chambers larger than said charges and formed in part by the bottom traveling wall of a traveling mold, the steps which include, progressively projecting continuously extruded unbroken lengths of said charges of sponge rubber compound simultaneously side-by-side through space onto a traveling conveyor surface, supporting said charges in exposed and accessible manner on said surface throughout a time consuming extent of travel thereof in a sufficiently level path to enable said charges to retain their random self assumed positions on said traveling surface, then selectively rearranging such of said charges on said traveling surface as may be necessary to bring them into corrected positions and relationship, then progressively playing off said rearranged charges from said traveling surface onto said traveling bottom mold wall in corrected position and in proper alignment to register with and be imprisoned respectively in said traveling vulcanizing chamber.

3. In a process for converting side-by-side simultaneously extruded separate charges of sponge rubber compound into articles of vulcanized sponge rubber involving the reception of said charges into traveling vulcanizing chambers larger than said charges and formed in part by the bottom traveling wall of a traveling mold, the steps which include, progressively projecting continuously extruded unbroken lengths of said charges of sponge rubber compound simultaneously side-by-side through space onto a traveling conveyor surface, supporting said charges in exposed and accessible manner on said surface throughout a time consuming extent of travel thereof in a sufficiently level path to enable said charges to retain their random self assumed positions on said traveling surface, then selectively rearranging such of said charges on said traveling surface as may be necessary to bring them into corrected positions and relationship, then progressively playing off said rearranged charges from said traveling surface onto said traveling bottom mold walls in corrected position and in proper alignment to register with and be imprisoned respectively in said traveling vulcanizing chambers, and then progressively deforming the charges on said traveling bottom mold walls by progressively squeezing the former against the latter before said charges are imprisoned in the vulcanizing chambers.

4. In a process for converting an extruded charge of sponge rubber compound into an article of vulcanized sponge rubber involving the reception of said charge into a traveling vulcanizing chamber larger than said charge and formed in part by the bottom traveling wall of a traveling mold, the steps which include, progressively and simultaneously extruding from a bulk supply of sponge rubber compound a continuous unbroken length of said charge of said compound, progressively playing out said continuous extruded length of said charge through space onto a traveling conveyor surface, supporting said charge in exposed and accessible manner on said surface throughout a time consuming extent of travel in a sufficiently level path to enable said charge to retain its random self assumed position on said traveling surface, then selectively rearranging said charge in such manner and to such extent as may be necessary to bring it into corrected position, and then progressively playing off said charge from said traveling surface onto said traveling bottom mold wall in corrected position and proper alignment to register with and be imprisoned in said traveling vulcanizing chamber.

FREDERICK M. DALEY.
LUDOLF H. DE WYK.